United States Patent Office 2,940,895
Patented June 14, 1960

2,940,895

COMPOSITION COMPRISING A MEMBER OF THE GROUP OF TETRAHYDROPYRIMIDINES AND GLYOXALIDINES AND A VEGETABLE TANNIN

Johannes Van Overbeek, Modesto, Calif., assignor to Shell Oil Company, a corporation of Delaware No Drawing. Filed Apr. 30, 1956, Ser. No. 581,396

20 Claims. (Cl. 167—33)

This invention relates to novel compositions and methods of combating fungi that infest plants. More particularly, it relates to improved compositions and methods for combating plant fungi whereby phytotoxicity is substantially or completely eliminated.

A plant fungicide must have a number of necessary and desirable properties before it may be used for treating plants. It must be low in cost, for when applied on large acreages, the cost of treatment can easily become prohibitive no matter how effective the fungicide may be. It must be effective against foliage pathogens which attack the crop that is to be protected. The fungicide, in order to be effective, should be able to resist weathering. That is to say, it should not easily wash off the plant to which it is applied as a fungus spore will germinate only in the presence of moisture. Hence, if the fungicidal composition does not resist weathering, fungi will appear shortly after the fungicidal composition washes off. It should not undergo photodecomposition, and it should not oxidize, or hydrolyze in the presence of moisture. The fungicide should be compatible with adjuvants and other active ingredients. It is desirable that a fungicide be soluble in common solvents, preferably water, or at least may be made easily soluble by using various derivatives of the fungicide, which derivatives also have fungicidal activity. Of utmost importance is that a fungicide should not affect the host plant adversely. This is a most difficult problem because, in essence, fungi exhibit properties and characteristics of higher plants. As a result, it is found that many compounds which exhibit excellent fungicidal properties cannot be used for agricultural purposes as they also materially damage the host plant to which they are applied.

Among such fungicides are certain N-heterocyclic compounds described in U.S. 2,658,895, 2,649,397 and 2,540,170. It is to the improvement of fungicides of the types therein described that this invention is mainly directed.

The measure of the damage to the host plant is termed "phytotoxicity." Phytotoxicity often may be indicated by a burning or blackening of the leaves and perhaps the stems of treated plants. In the case of fruit, such as apples, russeting frequently is caused. This typically is manifested by brownish scab-like growths and often is accompanied by severe deformation. Additionally, phytotoxicity may often cause reduced yields although the fungi may have been effectively reduced or eliminated.

Phytotoxicity may be described as being of two types—acute and chronic. The former is that which becomes apparent and is determined after a relatively short time, that is, less than 24 hours. The latter is evident only after considerably longer periods of time.

In an attempt to obtain a fungicide which has the desirable properties described, a number of N-heterocyclic compounds have been tested and indeed some have been found which very nearly approach a perfect fungicide. However, the problem of phytotoxicity is one that heretofore has resisted a satisfactory solution.

An object of this invention is to provide novel compositions and methods for combating plant fungi which will overcome the problem of phytotoxicity heretofore encountered. It is another object of this invention to provide such fungicidal compositions which are effective for the intended purpose, economical to use, compatible for purposes of application and which are stable when exposed to weathering conditions. Other objects will become apparent as the description proceeds.

It has now been found that phytotoxicity caused by certain active fungicides is completely, or substantially reduced by novel compositions and methods of this invention. The composition referred to are those which contain, as the active ingredient, substituted heterocyclic 1,3-diaza compounds having from 5 to 6 atoms in the heterocyclic ring, said atoms consisting solely of carbon and nitrogen, and a vegetable tannin in an amount effective to reduce the phytotoxicity.

From the foregoing description of the heterocyclic portion of the active ingredient, it will be seen that two configurations are possible. These are

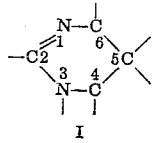

I and

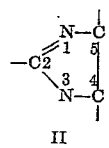

II

In the case of the radical shown by Formula I, the active ingredient is a substituted pyrimidine and in the case of Formula II it is a substituted glyoxalidine. Pyrimidines and glyoxalidines of these types are known to be effective fungicides and are suitable in many respects for combating fungi, but their commercial success has been hampered because they are too phytotoxic. By the instant invention, this critical disadvantage is overcome by a composition containing such an active ingredient and a vegetable tannin.

The nature of the active ingredients may be better understood by considering them in more detail.

The pyrimidines have the general formula

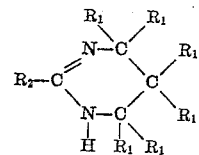

wherein $R_2$ represents a hydrocarbyl radical of from 6 to 23 carbon atoms attached directly to the 2-position and the $R_1$'s are selected from the group constituting a hydrogen atom and monovalent hydrocarbyl radicals as, for example, alkyl, aryl, alkaryl and aralkyl groups. Thus, $R_2$ may be cyclic or acyclic. It has been heretofore believed that effective fungicides of this type had to be carefully defined by their structure because in certain instances, as where $R_2$ is an alicyclic chain of less than 17 carbon atoms or an unsaturated chain, phytotoxicity becomes too great although the fungicidal properties may, in some cases, be even better. By reason of this invention, it is found that the hydrocarbyl substituents on the various ring atoms need not be limited as to degree of saturation or length of chain except as described.

The preferred compositions for combating fungi by the methods of this invention comprise the pyrimidines and vegetable tannins wherein the pyrimidine is a 3,4,5,6-tetrahydropyrimidine especially those having from 9 to 30 carbon atoms per molecule and at least 4 separate hydrocarbyl groups directly attached to at least 3 nuclear carbon atoms. Preferably, this group of pyrimidines has from 18 to 26 carbon atoms, and the optimum configuration may be described as a 2-alkyl-4,4,6-trialkyl-3,4,5,6-tetrahydropyrimidine wherein the alkyl group in the 2-position has from 10 to 23 carbon atoms. The outstanding species of this group is 2-heptadecyl-4,4,6-trimethyl-3,4,5,6-tetrahydropyrimidine. The substituents on the 4,4,6-position are not limited to any particular number of carbon atoms nor need they be saturated for it will be found that such compounds, which have heretofore been thought of as being too phytotoxic, now do not exhibit such a property, or at least it is so mall as to be negligible. As a practical matter, compounds that are easily prepared, and hence less expensive, are those in which the $R_1$'s are alkyl radicals up to about 12 carbon atoms. Still more preferred are those which contain not more than 4 carbon atoms on the heterocyclic ring. Some of the more preferred pyrimidines are: 2-decyl-4,4,6-trimethyl-3,4,5,6-tetrahydropyrimidine, 2-octadecyl-4,4,6-trimethyl-3,4,5,6-tetrahydropyrimidine, 2-tetradecyl-4,4,6-triethyl-3,4,5,6-tetrahydropyrimidine, 2-dodecyl-4,4,6-triisopropyl-3,4,5,6-tetrahydropyrimidine and 2-decyl-4,4,6-tributyl-3,4,5,6-tetrahydropyrimidine.

While compounds of the type described above are preferred, there are many others that may be used such as the following: 2-paratert-butylbenzyl-4,4,6-trimethyl-3,4,5,6-tetrahydropyrimidine, 2-heptadecyl-3,4,5,6-tetrahydropyrimidine and 4-octadecyl-3,4,5,6-tetrahydropyrimidine.

Another class of highly effective pyrimidines are those having from 9 to 30 carbon atoms per molecule and contain at least 5 hydrocarbyl radicals directly attached to not less than 3 nuclear carbon atoms. Such compounds are described as 2,4-dimethyl-2,4,6-trialkyl-2,3,4,5-tetrahydropyrimidines. The most effective species of this group is 2,2,4,4,6-pentamethyl-2,3,4,5-tetrahydropyrimidine. Other species of this type include 2,4-dimethyl-2,4,6-triethyl-2,3,4,5-tetrahydropyrimidine, 2,4-dimethyl-2,4,6-trioctyl-2,3,4,5-tetrahydropyrimidine, and the like.

Yet another class of pyrimidines which may constitute the active ingredient of the fungicidal composition containing a vegetable tannin are those that are termed 2-alkylphenyl-3,4,5,6-tetrahydropyrimidines. Of this class, the following are typical and preferred: 2-p-tolyl-3,4,5,6-tetrahydropyrimidines, 2-p-tert-butylphenyl-4-ethyl-3,4,5,6-tetrahydropyrimidines, 2-(2,4-dimethylphenyl)-3,4,5,6-tetrahydropyrimidines, 2 - (2,4-dimethylphenyl-4-ethylphenyl)-3,4,5,6-tetrahydropyrimidines, and the like.

Instead of the pyrimidines described, the active ingredient may also comprise glyoxalidines of the formula

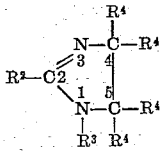

wherein $R^2$ is the same as indicated above, $R^3$ is selected from H, aminoethyl, and hydroxyethyl, and $R^4$ is hydrogen or lower alkyl. Such compounds include 2-heptadecyl glyoxalidine, 1-aminoethyl-2-heptadecyl glyoxalidine, 1-hydroxyethyl-2-heptadecyl glyoxalidine and the like. Still other glyoxalidines which may be used in the compositions and methods of this invention are described in greater detail in U.S. 2,540,170 but it is a particularly surprising embodiment of this invention that the compounds named therein as being too phytotoxic do not exhibit such properties when used in conjunction with the vegetable tannins. Such compounds include those wherein $R^2$ contains up to 17 carbon atoms which may include unsaturated hydrocarbyl radicals. Thus, where $R^2$ is a heptadecenyl group, it will be found that the phytotoxicity is so greatly reduced as to make their use highly satisfactory. Similarly, substituents in the 3-position may be used without adverse effect irrespective of the degree of unsaturation, the number of carbon atoms in the chain, or the substituent in the 2-position. Further, it is found that functional substituents on the glyoxalidine nucleus which have heretofore been unsatisfactory by reason of the phytotoxicity are now so materially reduced that they may also be used. This is of considerable importance because the functional groups aid in the solubilizing of the active ingredient in water so that the use with additional solubilizing adjuvants in some cases is not required. This discovery regarding the functional groups is now found to apply equally to the pyrimidines, the result being that there is no material decrease in the fungicidal properties.

It is not intended that the scope of this invention should be limited by any theoretical consideration for it is not fully understood why the tannins, sometimes referred to here as "safening agents," should have the effect of reducing or eliminating phytotoxicity caused by the compounds described above. Two possible explanations are offered, the first being that the tannin serves as a coupling agent between the leaf cuticle, or the outer tissue of the fruit, and the fungicide thereby preventing the penetration of the chemical into the plant tissue. This, of course, is a more favorable position for the fungicidal effect. Another possible explanation is that the tannin somehow reacts with the heterocyclic 1,3-diaza compound and thereby changes its nature so as to lessen its ability to cause phytotoxicity.

As referred to here, "vegetable tannin" refers to that large group of tanning materials that are obtainable mainly by the systematic lixiviation of natural tan-stuffs which are contained in the acorns, bark, fruit, galls, leaves, nuts, pods, roots, sap or wood of various plants. The vegetable tannins are all believed to contain free tannic acid or various derivatives thereof. Among the sources of the vegetable tannins are quebracho, redwood, sumach, oak, hemlock, chestnut, pistachio, Australian fir and eucalyptus. Many other plants provide rich sources of the vegetable tannins and it will be understood that the compositions and processes of this invention are not dependent upon the source of the vegetable tannins for many vegetable tannins have been synthetically produced.

As the tannins used in the products and methods of this invention are in a class well known by persons in the tanning industries, it will be apparent to those persons that a large variety of other materials which may be derived from natural products or may be synthetically prepared, are similarly suitable. Among such materials are chemical compounds that are somewhat similar in structure to vegetable tannins and are also included within the term "vegetable tannin." They include, for example, phenolic acids as methylene disalicyclic acid. Such materials are known by various names although it will be understood that they are essentially of the type herein described. Some of the more common names are listed below:

| | |
|---|---|
| Tannic acid | Ellagic acid |
| m-Digallic acid | Ellagitannin |
| Gallotannic acid | Galitannic acid |
| Trigalloyl glycerol | Cola tannin |
| Trigalloyl glucose | Quercitannic acid |
| Hexagalloyl mannite | Rheotannic acid |

It is well known that basic fungicides are advantageously used in the form of certain salts. Such salts may have the advantage of greater solubility in water or other polar solvents thus making their application easier and less costly. Such soluble salts are commonly used in fungicidal compositions which have an —NH group and include amine salts of mineral acids such as hydrochloric acid, sulfuric acid, nitric acid and phosphoric acid. They may also be salts of common organic acids such as benzoic acid, toluic acid, acetic acid, stearic acid, and the like. As in the case of the above acid salts, the tannins, which are used in combination with the above-described active ingredient, may be used in the form of tannates but it will be readily seen that the tannates comprise an entirely different class of salts for the reason that they impart not only solubility but, most important, they reduce or eliminate phytotoxicity and therefore are an active and essential part of the composition. Additionally, the tannins may be combined with the active ingredient by other methods. Thus, for example, the tannin may be present in addition to a salt of the active ingredient in which case a tannate is not formed. Alternatively, the active ingredient may be present in admixture of other salts and tannates. It is a particularly outstanding feature of this invention that it makes no difference in what manner or form the saftening agent is combined with the active ingredient as long as it is present in effective amounts.

The active ingredients may additionally be contained in compositions of organic solvents, aqueous emulsions and solid carriers which may be either dusts or gells. If desired, hydrocarbon oils may be used as carriers especially for the preparation of concentrates or if used in emulsifying form, when the composition comprises a vegetable tannin.

The amount of the tannin which is required in the fungicidal composition will vary depending upon such factors as the particular active ingredient, the degree of phytotoxicity which it causes, the nature of the fungus, the amount of infestation, when it is applied, the type of plants treated, and the like. For these reasons, it is difficult to state the amount of the tannin which is required in proportion to the active ingredient but it is found that as a general rule the safening agent may range from about 1:10 to 10:1. In most instances, the best results are obtained when the tannin is present in an equivalent amount of the active ingredient. In this regard, it is immaterial whether the active ingredient is present as a salt or in the form of its free base. It appears that quantities considerably less than the equivalent amount may be used with advantage but that an optimum is reached at a molar ratio of about 1:1. Greater quantities may be used but in most instances phytotoxicity is completely controlled long before great excesses are used.

The compositions in this invention may be divided into two general classes. These include concentrates such as those that would be marketed for dilution just prior to use in spraying. Such concentrates contain from about 1% to 90% of the active ingredient but more preferably from about 20% to 25%. If the final spray is to be used with a hydrocarbon oil carrier or sticking agent, the composition should contain from about .0005 to about 10% by weight of the active ingredient plus the tannin although for most purposes the most effective range is from .005 to .05%.

In some instances the application or incorporation of the compositions of this invention in a carrier such as a dust or powder is desired, as for example, in the treatment of seeds or for the application to foliage. Such dusts may contain pyrophylate, vegetable powder, silicate gel, bentonite, and other clay-like substances. When such compositions have added thereto a wetting agent, they are termed "wettable powders" and are used as dispersions or suspensions in water by spraying or dipping.

The test methods used in determining phytotoxicity comprise dissolving identical amounts of the material to be tested in isopropyl alcohol. The solution thus prepared is diluted with sufficient water to form a predetermined molar concentration by volume. It is then sprayed on the test plant to run-off. Phytotoxicity is determined by noting the degree of discoloration and damage to the leaf and stem area of the plant. The amount of phytotoxicity is measured in percent of the leaf damaged. In the following tables, the test compositions at the indicated ratio of the safening agent to the fungicidal compound are applied in a solution or emulsion. As applied to broad bean plants the test is indicative only of the acute phytotoxicity characteristics. When applied to celery to combat late celery blight the test will indicate both phytotoxic and fungicidal properties. The same also applies when used against the apple scab fungus, *Venturia inaequalis*.

Table I shows test results using certain pyrimidines and hydrochlorides thereof in determining their effect on the acute phytotoxicity of broad bean plants. In the following tables the expression Molar Conc. refers to the concentration of the active ingredient.

TABLE I

[Acute phytotoxicity (percent) broad bean plants.ᵃ]

| Treatment | Molar Conc. .00274 | Ratio 1:1 | Ratio 2:1 |
|---|---|---|---|
| 2-Heptadecyl-4,4,6-trimethyl-3,4,5,6-tetrahydropyrimidine hydrochloride | 40 | | |
| 2-Heptadecyl-4,4,6-trimethyl-3,4,5,6-tetrahydropyrimidine hydrochloride+tannic acid | | 1 | 0 |
| 2-Heptadecyl-4,4,6-trimethyl-3,4,5,6-tetrahydropyrimidine+tannic acid | | 1 | 0 |

ᵃ At .5% by weight of fungicidal composition.

Table II shows the test results using phosphate salts in the same manner as in Table I.

TABLE II

[Acute phytotoxicity (percent) broad bean plants.]

| Treatment | Molar Conc. .00274 | Ratio 1:1 |
|---|---|---|
| 2-Heptadecyl-4,4,6-trimethyl-3,4,5,6-tetrahydropyrimidine phosphate | 50 | |
| 2-Heptadecyl-4,4,6-trimethyl-3,4,5,6-tetrahydropyrimidine phosphate+tannic acid | | 0 |
| 2-Heptadecyl-4,4,6-trimethyl-3,4,5,6-tetrahydropyrimidine phosphate+gallic acid | | 0 |
| 2-Heptadecyl-4,4,6-trimethyl-3,4,5,6-tetrahydropyrimidine phosphate+quebracho extract | | 0 |
| 2-Heptadecyl-4,4,6-trimethyl-3,4,5,6-tetrahydropyrimidine phosphate+methylene disalicyclic acid | | 0 |

Table III shows the test results using certain glyoxalidines in the same manner as in Table I.

TABLE III

Acute phytotoxicity (percent) broad bean plants.]

| Treatment | Molar Conc. .00274 | Ratio 1:1 |
|---|---|---|
| 2-Heptadecylglyoxalidine | 50 | |
| 2-Heptadecylglyoxalidine+tannic acid | | 0 |
| 2-Heptadecylglyoxalidine+gallic acid | | 0 |
| 2-Heptadecylglyoxalidine+quebracho | | 0 |
| 2-Heptadecylglyoxalidine+methylene disalicyclic acid | | 0 |

From the above tables it is seen that the tannins very materially reduce phytotoxicity in broad bean plants. Table IV shows that these results are accomplished without any impairment of the fungicidal activity. These data on disease control and phytotoxicity were obtained by spraying the fungicidal preparation to potted plants, until it dropped off. Following a 24 hour period of drying, the plants were inoculated with the spores of the test fungus. After 7 to 10 days, assessments of disease control and chronic phytotoxicity were made by comparing with the untreated control plants and with plants treated with a standard fungicide. Acute phytotoxicity was determined after 24 hours. In the following table .0137 mole of the active ingredient is used as the control and in a ratio of 1:1 with the safening agent.

TABLE IV

*Celery late blight*

| Treatment | Acute Phytotoxicity (Percent) | | | Disease Control (Percent) | | |
|---|---|---|---|---|---|---|
| | Molar Conc. .0137 | Ratio 1:1 | Ratio 2:1 | Molar Conc. .00274 | Ratio 1:1 | Ratio 2:1 |
| 2-Heptadecyl-4,4,6-trimethyl-3,4,5,6-tetrahydropyrimidine | 10 | | | 89 | | |
| 2-Heptadecyl-4,4,6-trimethyl-3,4,5,6-tetrahydropyrimidine+tannic acid | | 0 | 0 | | 85 | 77 |
| 2-Heptadecyl-4,4,6-trimethyl-3,4,5,6-tetrahydropyrimidine+quebracho | | 0 | 0 | | 84 | |
| 2-Heptadecyl-4,4,6-trimethyl-3,4,5,6-tetrahydropyrimidine+methylene disalicyclic acid | | 0 | 0 | | 85 | |
| 2-Heptadecylpyrimidine+tannic Acid | | 0 | 0 | | 83 | |
| 2-p-tert-butylphenyl-4,4,6-trimethyl-3,4,5,6-tetrahydropyrimidine+tannic acid | | 0 | 0 | | 84 | |

Comparative test results are given for chronic phytotoxicity, in percent, of celery late blight in Table V.

TABLE V

| Treatment | Molar Conc. .00274 | Ratio 1:1 |
|---|---|---|
| 2-Heptadecyl-4,4,6-trimethyl-3,4,5,6-tetrahydropyrimidine | 20 | |
| 2-Heptadecyl-4,4,6-trimethyl-3,4,5,6-tetrahydropyrimidine+tannic acid | | 0 |
| 2-Heptadecyl-4,4,6-trimethyl-3,4,5,6-tetrahydropyrimidine+quebracho | | 0 |
| 2-Heptadecyl-4,4,6-trimethyl-3,4,5,6-tetrahydropyrimidine+methylene disalicyclic acid | | 0 |
| 2-Heptadecylpyrimidine+tannic acid | | 0 |
| 2-p-tert-butylphenyl-4,4,6-trimethyl-3,4,5,6-tetrahydropyrimidine+tannic acid | | 0 |

Table VI shows various test results in reducing phytotoxicity in combating apple scab. In this test a .12% solution, by weight of the control composition in isopropyl alcohol is sprayed on the growing apple plants. In the case of the mixture of the active ingredient and the safening agent, a .12% solution by weight, at a molar ratio of 1:1 is applied.

TABLE VI

| Treatment | Percent Phytotoxicity | Percent Leaf Area Infected |
|---|---|---|
| No Treatment | | 70-75 |
| 2-Heptadecyl-4,4,6-trimethyl-3,4,5,6-tetrahydropyrimidine (control) | 50 | 20 |
| 2-Heptadecyl-4,4,6-trimethyl-3,4,5,6-tetrahydropyrimidine+tannic acid | 0 | 20 |
| 2-Heptadecyl-4,4,6-trimethyl-3,4,5,6-tetrahydropyrimidine nitrate | 50 | 25 |
| 2-Heptadecyl-4,4,6-trimethyl-3,4,5,6-tetrahydropyrimidine nitrate+tannic acid | 0 | 25 |
| 2-Heptadecyl-4,4,6-trimethyl-3,4,5,6-tetrahydropyrimidine hydrochloride | 55 | |
| 2-Heptadecyl-4,4,6-trimethyl-3,4,5,6-tetrahydropyrimidine hydrochloride+tannic acid | 0 | 20 |
| 2-Heptadecyl-4,4,6-trimethyl-3,4,5,6-tetrahydropyrimidine hydrochloride+quebracho | 0 | 25 |
| 2-Heptadecyl-4,4,6-trimethyl-3,4,5,6-tetrahydropyrimidine hydrochloride+methylene disalicyclic acid | 0 | 20 |

In the same series of tests it was observed that the calyx end of the fruit of the plants which were not treated with the tannin composition had pronounced damage whereas those that had been treated with the novel composition had no injury.

From the foregoing description, it will be seen that there are a number of variables, but such variables are within the scope of the disclosure and claims. Thus, for example, the choice of the safening agent may be made entirely upon economic consideration. Likewise, the active fungicide may be selected from those that are most economically prepared. Other considerations, such as the nature of adjuvants which may be used, are choices which are within the skill of persons familiar with the problems of combating plant fungi. In considering the use of adjuvants it will be readily understood that surface active wetting agents may be advantageously used in certain instances as where the mixture to be applied is difficultly soluble or is used in combination with sticking agents. Similarly, there will be instances where emulsifying agents are more advantageously used as, for example, in those cases where a solid carrier is used in the composition.

Among the surface active wetting agents that are commonly used for this purpose there may be mentioned the alkyl aryl sulfonates such as Nacconol A and Nekal BA75, lignosulfonates as Marasperse C, and the like.

I claim as my invention:

1. A composition comprising a heterocyclic, 1,3-diaza compound selected from the group consisting of (a) tetrahydropyrimidines of the formula

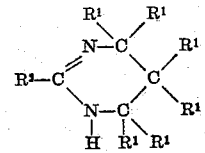

(b) glyoxalidines of the formula

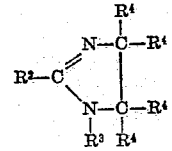

and (c) fungicidal salts thereof, wherein $R^1$ is a member of the class consisting of hydrogen and alkyl groups of from 1 to 12 carbon atoms; $R^2$ is a member of the class consisting of the alkyl and the alkaryl groups of from 6 to 23 carbon atoms, $R^3$ is a member of the class consisting of hydrogen, aminoethyl, and hydroxyethyl, and $R^4$ is a member of the class consisting of hydrogen and lower alkyl, and a vegetable tannin.

2. A composition comprising a fungicidal salt of a pyrimidine, said pyrimidine having the formula

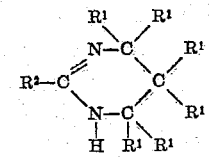

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and a vegetable tannin.

3. A composition comprising a pyrimidine of the formula

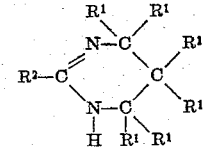

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and a vegetable tannin.

4. A composition comprising a glyoxalidine in which the only substituent is an alkyl group of from 6 to 23 carbon atoms in the 2-position and a vegetable tannin.

5. The method of combating fungi which comprises treating growing plants subject to attack by said fungi with a composition comprising a heterocyclic 1,3-diaza compound selected from the group consisting of (a) tetrahydropyrimidines of the formula $$R^2-C\begin{array}{c}N-C(R^1)(R^1)\\ \parallel\\ \\ N-C(R^1)(R^1)\\ |\\ H\end{array}C(R^1)(R^1)$$

(b) glyoxalidines of the formula $$R^2-C\begin{array}{c}N-C(R^4)(R^4)\\ \parallel\\ \\ N-C(R^4)(R^4)\\ |\\ R^3\end{array}$$

and (c) fungicidal salts thereof, wherein $R^1$ is a member of the class consisting of hydrogen and alkyl groups of from 1 to 12 carbon atoms, $R^2$ is a member of the class consisting of the alkyl and the alkaryl groups of from 6 to 23 carbon atoms, $R^3$ is a member of the class consisting of hydrogen, aminoethyl, and hydroxyethyl, and $R^4$ is a member of the class consisting of hydrogen and lower alkyl, and a vegetable tannin.

6. The method of combating fungi which comprises treating growing plants subject to attack by said fungi with a composition comprising a fungicidal salt of a pyrimidine, said pyrimidine having the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and a vegetable tannin.

7. The method of combating fungi which comprises treating growing plants subject to attack by said fungi with a composition comprising a pyrimidine of the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and a vegetable tannin.

8. The method of combating fungi which comprises treating growing plants subject to attack by said fungi with a composition comprising a glyoxalidine in which the only substituent is an alkyl group of from 6 to 23 carbon atoms in the 2-position and a vegetable tannin.

9. A composition comprising a fungicidal salt of a pyrimidine, said pyrimidine having the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and tannic acid.

10. A composition comprising a fungicidal salt of a pyrimidine, said pyrimidine having the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and quebracho.

11. A composition comprising a fungicidal salt of a pyrimidine, said pyrimidine having the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and methylene disalicyclic acid.

12. A composition comprising a pyrimidine of the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and quebracho.

13. A composition comprising a 2-heptadecyl glyoxalidine of the formula $$C_{17}H_{35}-C\begin{array}{c}N-C(R^4)(R^4)\\ \parallel\\ \\ N-C(R^4)(R^4)\\ |\\ R^3\end{array}$$

wherein $R^3$ is a member of the class consisting of hydrogen, aminoethyl, and hydroxyethyl, $R^4$ is a member of the class consisting of hydrogen and lower alkyl, and a vegetable tannin.

14. The method of combating fungi which comprises treating growing plants subject to attack by said fungi with a composition comprising a pyrimidine of the formula $$R^2-C\begin{array}{c}N-C(R^1)(R^1)\\ \parallel\\ \\ N-C(R^1)(R^1)\\ |\\ H\end{array}C(R^1)(R^1)$$

where $R^2$ is a member of the class consisting of the alkyl and the alkaryl groups of from 6 to 23 carbon atoms, and $R^1$ is a member of the class consisting of hydrogen and alkyl groups of from 1 to 12 carbon atoms, and methylene disalicyclic acid.

15. The method of combating fungi which comprises treating growing plants subject to attack by said fungi with a composition comprising a 2-heptadecyl glyoxalidine of the formula

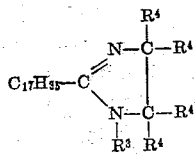

wherein $R^3$ is a member of the class consisting of hydrogen, aminoethyl, and hydroxyethyl, $R^4$ is a member of the class consisting of hydrogen and lower alkyl, and a vegetable tannin.

16. A composition comprising 2-heptadecyl-4,4,6-trimethyl-3,4,5,6-tetrahydropyrimidine hydrochloride and a vegetable tannin.

17. A composition comprising 2-heptadecyl-4,4,6-trimethyl-3,4,5,6-tetrahydropyrimidine phosphate and a vegetable tannin.

18. A composition comprising 2-heptadecyl-4,4,6-trimethyl - 3,4,5,6 - tetrahydropyrimidine and a vegetable tannin.

19. The method of combating fungi which comprises treating growing plants subject to attack by said fungi with a composition containing 2 - heptadecyl - 4,4,6 - trimethyl - 3,4,5,6 - tetrahydropyrimidine hydrochloride and a vegetable tannin.

20. The method of combating fungi which comprises treating growing plants subject to attack by said fungi with a composition containing 2 - heptadecyl - 4,4,6 - trimethyl- 3,4,5,6-tetrahydropyrimidine and a vegetable tannin.

References Cited in the file of this patent

UNITED STATES PATENTS

| | | |
|---|---|---|
| 1,928,968 | Jones | Oct. 3, 1933 |
| 2,061,063 | Dangelmajer | Nov. 17, 1936 |
| 2,456,587 | Koppenhoefer | Sept. 20, 1946 |
| 2,540,170 | Law et al. | Feb. 6, 1951 |
| 2,649,397 | Ballard | Aug. 13, 1957 |
| 2,802,770 | Monroe et al. | Aug. 13, 1957 |

FOREIGN PATENTS

| | | |
|---|---|---|
| 512,908 | Canada | May 17, 1955 |

OTHER REFERENCES

Contribution from Boyce Thompson Inst., vol. 14, pp. 151–160, 1946.

Fungicides and Their Actions, Horsfall, vol. II, pp. 172–188, 1945.